United States Patent [19]

Bors et al.

[11] Patent Number: 5,562,953
[45] Date of Patent: Oct. 8, 1996

[54] METHOD FOR LIGHT-ASSISTED CURING OF COATINGS

[75] Inventors: Daniel A. Bors, Warminster; William D. Emmons, Huntingdon Valley; Steven S. Edwards, Horsham, all of Pa.

[73] Assignee: Rohm and Haas Company, Philadelphia, Pa.

[21] Appl. No.: 342,319

[22] Filed: Nov. 18, 1994

Related U.S. Application Data

[62] Division of Ser. No. 151,649, Nov. 15, 1993, abandoned, which is a division of Ser. No. 920,972, Jul. 28, 1992, Pat. No. 5,296,530.

[51] Int. Cl.[6] ....................................................... C23C 8/00
[52] U.S. Cl. .................. 427/558; 427/388.2; 427/389.7; 427/559; 427/551
[58] Field of Search ......................... 524/558; 525/328.6, 525/378, 379, 380; 427/388.2, 389.7, 551, 558, 559

[56] References Cited

U.S. PATENT DOCUMENTS 4,906,684  3/1990  Say .......................................... 524/548

FOREIGN PATENT DOCUMENTS

| 4928471 | 1/1992 | European Pat. Off. . |
| 1541891 | 3/1979 | United Kingdom . |
| 9316133 | 8/1993 | WIPO . |

*Primary Examiner*—Judy M. Reddick
*Attorney, Agent, or Firm*—Ronald D. Bakule

[57] ABSTRACT

This invention relates to a method for light-assisted curing of coatings by providing coatings with an enamine content sufficient to enhance the cure rate of the coatings. The coatings exhibit improved weatherability and gloss retention when exposed to light.

2 Claims, No Drawings

METHOD FOR LIGHT-ASSISTED CURING OF COATINGS

This is a divisional of application Ser. No. 151,649, filed Nov. 15, 1993 now abandoned which is a divisional of application Ser. No. 920,972, filed Jul. 28, 1992 now U.S. Pat. No. 5,296,530.

FIELD OF THE INVENTION

This invention relates to a method for light-assisted curing of coatings. More particularly, this invention is directed to a method for improving the rate of coatings property development of coatings subjected to ultraviolet radiation ("UV") or sunlight by providing coatings with an enamine content sufficient to enhance the cure rate of the coating.

BACKGROUND OF THE INVENTION

It is advantageous for coatings to cure quickly, particularly to develop favorable surface properties such as, for example, print and block resistance and good resistance to weathering.

In the particular case of coatings incorporating emulsion-polymerized latex polymer coatings binders, there is a need for a soft binder polymer, i.e., a polymer with a low glass transition temperature (Tg), so that facile film formation can be achieved while at the same time there is a need for the surface hardness, print resistance, outdoor durability, etc. characteristic of a harder polymer. This problem can be solved by using a coating binder which will cure quickly after a film is formed, thereby achieving a beneficial level of coatings properties.

The method of this invention provides an improved rate of coatings property development of coatings subjected to ultraviolet radiation ("UV") or sunlight by providing coatings with an enamine content sufficient to enhance the cure rate of the coating.

DESCRIPTION OF THE PRIOR ART

U.S. Pat. No. 4,908,229 discloses method for forming an article containing a radiation crosslinked polymer and the article produced thereby. A polymer comprising pendant functional groups having the formula

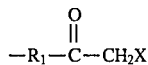

where $R_1$ is a divalent radical and X is selected from the group consisting of organoacyl and cyano is crosslinked by exposure to radiation having a wavelength in the range of about $10^{-3}$ to about 400 nm. An experiment is described in which the pH of four samples of latex are adjusted to pH 2, 4, 6 and 8 prior to UV cure.

U.S. Pat. No. 4,855,349 discloses mastic and caulking compositions which contain polymers of the same formula as in U.S. Pat. No. 4,908,229, described herein-above. Also disclosed is the preparation of a functional monomer-containing polymer which includes a pH adjustment to 8.5 with ammonia.

U.S. Pat. No. 4,812,541 discloses a high performance pressure-sensitive adhesive which contains acetoacetoxyethyl methacrylate, a N-vinyl lactam monomer and a glycidyl monomer. Post-polymerization crosslinking using heat, actinic or electron beam radiation is disclosed.

Japanese Published Patent Application No. 01-229242 discloses a photosensitive resin composition composed of a base polymer which consists of acrylic resin containing acetoacetyl group, an ethylenic unsaturated compound and a photopolymerization initiator.

Japanese Published Patent Application No. 61-14173 discloses the preparation of water resistant acetoacetate group-containing water soluble polymer, characterized by irradiating the polymer with ultraviolet light.

None of the references discloses a method for improving the rate of coatings property development of coatings subjected to ultraviolet radiation ("UV") or sunlight by providing coatings with an enamine content sufficient to enhance the cure rate of the coating.

It is an object of the invention to provide a method for curing coatings exposed to sunlight, which coatings quickly develop good surface properties after application to surfaces.

Another object of the invention is to provide a method for curing coatings which can be used for industrial UV cure applications.

SUMMARY OF THE INVENTION

A method for improving the rate of property development of coatings subjected to ultraviolet radiation ("UV") or sunlight by providing coatings with an enamine content sufficient to enhance the cure rate of the coating is provided. This invention provides a quick-curing coating prepared from a polymer having acetoacetyl groups, in which substantially all of the acetoacetyl groups have been converted to enamine functionality, for example by treatment with ammonia or primary amine. Coatings which are so prepared cure more quickly under sunlight or ultraviolet light than coatings which contain the acetoacetyl functional polymer which has not been converted to enamine.

In one embodiment, the invention provides a coating for application to surfaces which are exposed to sunlight. This coating develops cure rapidly when exposed to sunlight, which improves early development of surface resistance properties such as print resistance and outdoor durability, as demonstrated, for example, by enhanced retention of gloss on outdoor exposure. The operative portion of the solar spectrum appears to be at wavelengths from about 295 nm. to about 400 nm.

In another embodiment, the invention provides an improved coating for use in industrial radiation cure procedures.

In another embodiment, the invention provides a process for preparing a liquid coating from acetoacetyl functional polymer, which develops cure more rapidly under solar exposure than acetoacetyl polymer coatings that are not prepared according to the process.

DETAILED DESCRIPTION OF THE INVENTION

In one aspect we have found that when acetoacetyl functional polymers are treated with an excess of a stoichiometric amount of ammonia or primary amine to form enamine, they react more quickly when exposed to ultraviolet light than an untreated sample of the same acetoacetyl functional polymer. The polymers which contain the enamine form of the acetoacetyl functional group show a more rapid development of properties indicative of cure, such as a quickly reduced swell ratio and a quick reduction in soluble fraction. This demonstrates that the sunlight-induced cure of the enamine functional polymer progresses more rapidly than sunlight-induced cure of the corresponding acetoacetyl functional polymer.

Enamine

As indicated above, the major use for this technology is for curing vinyl polymers dispersed or dissolved in aqueous solvents. Unfortunately, vinyl polymers containing pendant acetoacetate are prone to hydrolysis in water particularly on heat aging. The hydrolysis occurs at nearly any pH and yields acetoacetic acid,

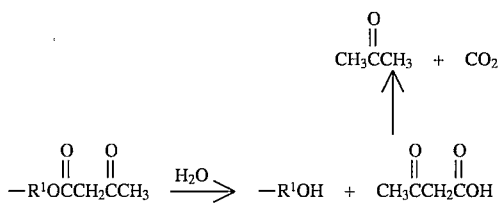

which in turn decomposes to acetone and carbon dioxide.

In co-pending application Ser. No. 07/633,302, we disclosed that this problem may be eliminated by treating the aqueous acetoacetate polymer, after preparation and neutralization, with one molar equivalent of ammonia or a primary amine such as ethanolamine, methyl amine, isopropyl amine, ethanol amine, or diglycol amine.

Typically, the polymer is first neutralized to a basic pH, preferably a pH greater than 9, before adding the one molar equivalent for enamine formation. Under these conditions the enamine is formed. The reaction to form the enamine is generally rapid with the rate of formation increasing with temperature. In general, enamine formation is complete within 24 hours. An alternative approach is to raise the pH to about 9, allow the system to equilibrate, and readjust the pH to about 9 to replace the amine consumed by enamine formation. The enamine is stable to hydrolysis.

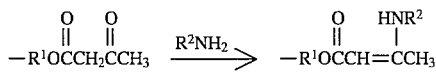

The amount of ammonia or amine used should be at least equivalent to the amount of acetoacetate and copolymerized acid in the polymer. Sterically hindered primary amines such as t-butyl amine and aromatic amines such as aniline are not suitable because of incomplete enamine formation. The enamine formation is a reversible reaction, so that as the ammonia or amine evaporates, the pendant acetoacetate is slowly regenerated in the film, but not before cure of the enamine composition has occurred. The wet composition is quite storage stable, however, as long as it is stored under conditions (such as a closed container) where the amine/ammonia cannot evaporate.

In another alternative embodiment vinyl polymers containing equivalent pendant enamine functionally may be formed from preformed enamine monomers derived from an appropriate amine and an acetoacetate monomer. In this case, the pH must be kept on the alkaline side during polymerization to avoid hydrolysis of the enamine back to the acetoacetate.

A typical method of preparing the coatings is to treat an acetoacetyl functional polymer with ammonia or primary amines, then allow the composition to equilibrate. As the ammonia or amine reactant is consumed in the enamine formation reaction, the pH of the composition will drop. We have found that readjusting the pH with ammonia or primary amines to about 8.5 improves the rate of cures. Preferably, the pH is adjusted to about 9, more preferably about 9.5.

Primary amines can be used to adjust the pH to above 9.5, however, further addition of ammonia at pH 9.5 is not recommended since this does not raise the pH and instead results in ammonium salt formation.

Sunlight will promote a rapid development of cure in these coatings, shortening the period in which the newly applied coating is vulnerable to forces which could damage or remove the coating or mar the appearance.

Photoinitiators, such as benzophenone, may be added to further enhance the speed of cure.

The coating compositions and processes according to the invention may be used to prepare exterior coatings which develop surface cure rapidly under exposure to sunlight. Surface cure aids in providing improved solvent resistance and enhanced outdoor durability as may be evidenced, for example, by higher retention of the original gloss of exterior coatings after outdoor exposure or simulated outdoor exposure. Such coatings include architectural coatings such as exterior house paints, mastics and caulks and industrial maintenance coatings for metal, such as exposed structural steel on bridges, above-ground storage tanks, etc., which are exposed to incident sunlight. Also included are coatings which are exposed to incident sunlight even though they are parially or wholly inside a structure such as, for example, a building and an automobile.

The compositions and processes are also useful in coatings for industrial ultraviolet line cure.

The compositions can be cured using a source of ultraviolet radiation of wavelengths between about 200 nm. andabout 400 nm. The compositions cure more rapidly on UV equipment than compositions which contain the same acetoacetyl functional polymer which had not been prepared according to the invention.

Polymers

The preferred polymers for use in this invention are vinyl addition polymers with acetoacetate groups which are available for reaction. Generally, the acetoacetate groups are attached to the polymer backbone via an organic divalent radical $R^1$ which in turn is attached to the acetoacetate moiety or by a trivalent organic radical $R^2$ bearing two acetoacetate groups.

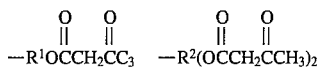

The acetoacetate functional polymers may be prepared by means known in the art. A preferred method is polymerization or copolymerization of an acetoacetate functional monomer. A preferred monomer is acetoacetoxyethyl methacrylate which is referred to throughout this specification as AAEM, shown below.

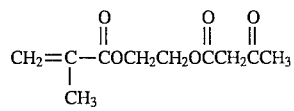

Examples of other monomers useful for introduction of acetoacetate functionality are acetoacetoxyethyl acrylate, acetoacetoxypropyl methacrylate, allyl acetoacetate, acetoacetoxybutyl methacrylate, 2,3-di(acetoacetoxy)propyl methacrylate and the like. In general, any polymerizable hydroxy functional monomer can be converted to the corresponding acetoacetate by reaction with diketene or other suitable acetoacetylating agent (See e.g. *Comparison of Methods for the Preparation of Acetoacetylated Coating Resins,* Witzeman, J. S.; Dell Nottingham, W.; Del Rector, F. J. Coatings Technology; Vol. 62, 1990, 101 (and references contained therein)).

The vinyl polymers of this invention are most often copolymers of the acetoacetate functional monomer and other monomers. Examples of useful comonomers are simple olefins such as, for example, ethylene; alkyl acrylates and methacrylates where the alkyl group has 1 to 20 carbon atoms (more preferably 1 to 8 carbon atoms), vinyl acetate, acrylic acid, methacrylic acid, acrylonitrile, styrene, isobornyl methacrylate, acrylamide, hydroxyethyl acrylate and methacrylate, hydroxypropyl methacrylate and acrylate, N-vinyl pyrolidinone, butadiene, isoprene, vinyl halides such as vinyl chloride and vinylidene chloride, alkyl maleates, alkyl fumarates, fumaric acid, maleic acid, itaconic acid, etc. It is also possible and sometimes desirable to include low levels of divinyl or polyvinyl monomers such as glycol polyacrylates, allyl methacrylate, divinyl benzene, etc. to introduce a controlled amount of gel in the latex particle. It is important, however, to be sure that when this is done, the quality of the film formation is not seriously impaired.

Alternatively, a polymer having acetoacetate functionality introduced on the chain end by an acetoacetate functional mercaptan as disclosed in U.S. Pat. No. 4,960,924, hereby incorporated herein by reference, may be used in this invention.

The acetoacetate-functional polymer may contain from about 0.5% to 100% of the acetoacetate-functional monomer, by weight based on the weight of the polymer. In any application, the amount of acetoacetate functional monomer required will vary from case to case depending upon the desired degree of cure necessary in the particular end use application. Preferably, the acetoacetate-functional polymer may contain from about 0.5% to about 20% of the acetoacetate-functional monomer, by weight based on the weight of the polymer.

Polymers having a molecular weight of from about 1000 to over one million can be used. The lower molecular weight polymers should contain a sufficiently high level of acetoacetate to achieve useful cure. For example, a copolymer of AAEM having a molecular weight under 10,000 would typically contain 30% or more of AAEM.

Generally, the vinyl polymer is prepared as a dispersion or emulsion polymer in water by a suitable free radical initiated polymerization technique, using a free radical initiator and appropriate heating. Since a film forming polymer is required, useful emulsion polymers will generally have Tg s under 60° C. since these polymers, with sufficient coalescent, will form good quality films at ambient temperatures. If soluble polymers are used in the film formation process, polymers of higher glass transition temperature are readily used since they are film-forming directly on solvent evaporation. The film formation process is well known in the coatings industry and is described in detail by J. Bentley ("Organic Film Formers" in *Paint and Surface Coatings,* R. Lambourne (Editor), John Wiley and Sons, New York, N.Y., 1987).

Polymer Preparation

In certain aspects of the invention, polymerization in an aqueous medium, and in particular, aqueous emulsion polymerization, is used to prepare the polymer. Conventional surfactants can be used (e.g. anionic and/or nonionic emulsifiers such as alkali or ammonium alkyl sulfates, alkyl sulfonic acids, and fatty acids, oxyethylated alkyl phenols, etc.) The amount of surfactant used is usually 0.1 to 6% by weight, based on the weight of total monomer. Either thermal or redox initiation processes may be used. Conventional free radical initiators may be used (hydrogen peroxide, t-butyl hydroperoxide, ammonium and/or alkali persulfates, etc.); typically 0.05 to 3.0 % by weight based on the weight of total monomer. Redox systems using the same initiators coupled with a suitable reductant (for example: isoascorbic acid, sodium bisulfite) can be used at similar levels. A chain transfer agent such as, for example, a mercaptan (for example: n-octyl mercaptan, n-dodecyl mercaptan, butyl or methyl mercaptopropionate, mercaptopropionic acid at 0.05 to 6% by weight based on total weight of monomer) may be used.

The invention may also be practiced using a solvent-soluble or water-soluble polymer. When this is desired, the polymer may be prepared directly in water if the monomer mix is water soluble or, alternatively, the polymerization solvent may be a water miscible solvent such as isopropanol, butyl cellosolve, propylene glycol, etc. In this case, water may be included in the polymerization mixture or post-added after the polymerization is complete. In some cases, the polymer is prepared in a conventional organic solvent such as xylene or toluene. When organic solvent is employed, with or without water, it is convenient to use a soluble organic free radical initiator such as azo-bis-isobutyronitrile, t-butyl-peroctoate, or benzoyl peroxide and whatever heat is convenient to assure smooth copolymerization.

In another embodiment, an alkali-soluble polymer is prepared by making a vinyl emulsion polymer having enough acrylic or methacrylic acid or other polymerizable acid monomer (usually greater than 10%) and solubilizing the emulsion polymer by addition of ammonia or other base. Alkali-soluble polymers of this type may be advantageously used as blends with conventional dispersion polymers, preferably with those dispersion polymers which also have pendant acetoacetate functionality. Systems of this type may co-cure when exposed to a free radical flux. The blend of alkali-soluble resin and latex polymer has a particularly advantageous property combination of gloss and rheology and is useful in coatings and printing ink applications.

In another embodiment of this invention, an aqueous dispersion contains copolymer particles made up of at least two mutually incompatible copolymers. These mutually incompatible copolymers may be present in the following morphological configurations, for example, core/shell, core/shell particles with shell phases incompletely encapsulating the core, core/shell particles with a multiplicity of cores, interpenetrating network particles, and the like. In all of these cases, the majority of the surface area of the particle will be occupied by at least one outer phase and the interior of the particle will be occupied by at least one inner phase. The mutual incompatibility of the two polymer compositions may be determined in various ways known in the art. The use of scanning electron microscopy using staining techniques to emphasize the difference between the appearance of the phases, for example, is such a technique.

The emulsion polymerization techniques used to prepare such dispersions are well known in the art. It is sometimes advantageous to introduce some crosslinking or gel structure by the sequential polymerization process in the core via low levels of a crosslinking monomer such as allyl methacrylate.

The lightly crosslinked core does not adversely affect film formation and does in some cases result in better coatings, particularly when the pendant acetoacetate is concentrated in the shell.

GLOSSARY

The following abbreviations are used in these Examples and are to be understood as having the meaning set forth in this glossary. All percentages in these examples are percent by weight unless otherwise specified.
AAEM—acetoacetoxyethyl methacrylate
Comp.—Comparative
DEAP—diethoxyacetophenone
ITX—isopropylthioxanthone
MEK—methyl ethyl ketone
SF —soluble fraction
SR —swell ratio
TMPTAcAc—trimethylolpropane trisacetoacetate
ml—milliliters
g—gram
eq.—equivalent

EXAMPLES

TEST PROCEDURES

The following test procedures were used to generate the data reported in the Examples below:

Film Soluble Fraction and Swell Ratio by Weight Determinations

Thin films were cast down on glass slides, a portion of the film was cut and removed from the glass slide. The samples were weighed and then soaked overnight in a container of acetone. The acetone solution was filtered. The solvent mixture was evaporated in the oven at 150° C. for 30 minutes and the residue weighed. The soluble fraction was determined by division. The remaining acetone soaked film was also weighed and the swell ratio was calculated by determining the ratio of the acetone swollen film to the the difference between the original film weight minus the weight of the soluble fraction.

Film Swell Ratio by Volumetric Determinations

Thin films were cast down on glass slides and a portion of the film was cut and removed from the glass slide (soaking the glass slide in warm water for a few minutes aids film removal). The film samples were measured in two directions (length and width). The samples were then soaked for 15 minutes in methyl ethyl ketone and remeasured. The increase in each dimension was averaged to yield an average numeric value for linear swell, and the result was then cubed to yield a volumetric swell ratio.

Print Resistance

Thin films were cast down on black vinyl sheet and cured at ambient temperatures. A layer of cheesecloth was then placed over the film and covered by a rubber stopper that had a surface area of approximately one square inch. A one kilogram weight was placed on top of the stopper. The resulting test sample was then placed in an oven for the reported time at the reported temperature (typically for two hours at 60° C.) and then cooled. The print was then rated on a scale of 1 to 10 (best) according to observed ease of removal of the cheesecloth and the depth of the imprint of the film.

EXAMPLE 1

UV Cure From Outdoor Exposure—Effect of Enamine Formation

A polymer (I) was prepared from a monomer mixture that contained 525 g. water, 7.28 g. sodium dodecyl benzene sulfonate (23% solution), 721 g. butyl acrylate, 826 g. methyl methacrylate and 20.4 g. methacrylic acid. From this monomer emulsion mixture, 49.1 g. was removed and added to a kettle containing a mixture of 1269 g. water and 9.84 g. sodium dodecyl benzene sulfonate heated to 85° C. under nitrogen. 2.36 g. sodium persulfate dissolved in 78.8 g. water was added. Ten minutes later, the remaining monomer emulsion was gradually added over a two hour period along with 1.4 g. sodium persulfate dissolved in 50 grams. After the two hour period, the emulsion was cooled to 60° C. and 1.0 g. t-butyl hydroperoxide dissolved in 13 g. water was added followed by 0.5 g. isoascorbic acid dissolved in 13 g. water. The latex was cooled to ambient temperature.

In a similar procedure, polymer (II) was prepared from a monomer mixture that contained 525 g. water, 7.28 g. sodium dodecyl benzene sulfonate (23% solution), 681.6 g. butyl acrylate, 786.8 g. methyl methacrylate, 78.4 g. acetoacetoxyethyl methacrylate and 20.4 g. methacrylic acid.

A 100 g. portion of polymer 1 was neutralized to pH=9.5 with ammonia. A 100 g, portion of polymer II was neutralized to pH=9.5 with sodium hydroxide. Another 100 g. portion of polymer II was neutralized to pH=9.5 with ammonia, an additional 0.52 g. ammonia was added (one equivalent based on acetoacetate) to ensure complete enamine formation. To all three samples was added a premix consisting of 0.63 g. nonionic surfactant (Triton X-405; Union Carbide), 4.4 grams of propylene glycol, 4.4 g. diisopropyladipate and 1.1 g. 10% aqueous solution of urethane rheology modifier (QR-708; Rohm and Haas). The formulated mixture was equilibrated for 24 hours and then applied on glass plates to give 3–4 mil thick coatings. One set of films were placed outdoors in complete sunlight for 7 days; the other set was placed in a dark cabinet. Film swell ratios in methyl ethyl ketone were obtained.

| Film | AAEM % | Base | Film Swell Ratios | |
| --- | --- | --- | --- | --- |
| | | | unexposed | exposed |
| 1 | 0% | ammonia | dissolve | dissolve |
| 2 | 5% | NaOH | dissolve | 4.6 |
| 3 | 5% | ammonia | dissolve | 3.1 |

Film 3 according to the invention demonstrates better cure compared to comparative examples 1 and 2.

EXAMPLE 2

UV Cure From Outdoor Exposure—Effect of AAEM Level

In a similar procedure to polymer I (Example 1), a polymer (III) was prepared from a monomer mixture that contained 525 g. water, 7.28 g. sodium dodecyl benzene sulfonate (23% solution), 721 g. butyl acrylate, 826 g. methyl methacrylate, 20.4 g. methacrylic acid and 3.13 g. n-dodecylmercaptan.

In a similar procedure, polymer (IV) was prepared from a monomer mixture that contained 525 g. water, 7.28 g. sodium dodecyl benzene sulfonate (23% solution), 681.6 g. butyl acrylate, 786.8 g. methyl methacrylate, 78.4 g. acetoacetoxyethyl methacrylate, 20.4 g. methacrylic acid and 3.13 g. n-dodecylmercaptan.

In a similar procedure, a polymer (V) was prepared from a monomer mixture that contained 525 g. water, 7.28 g. sodium dodecyl benzene sulfonate (23% solution), 642.6 g. butyl acrylate, 747.6 g. methyl methacrylate, 156.7 g. acetoacetoxyethyl methacrylate, 20.4 g. methacrylic acid and 3.13 g. n-dodecylmercaptan.

A 100 g. portion of each polymer was neutralized to pH=9.5 with ammonia, an additional 0.52 g. of ammonia was added (one equivalent based on acetoacetate) to ensure complete enamine formation. To all three samples was added a premix consisting of 0.32 g. nonionic surfactant (Triton X-405; Union Carbide), 4.4 g. propylene glycol, 4.4 g. coalescent (Texanol) and 1.1 g. a 10% aqueous solution of urethane rheology modifier (QR-708; Rohm and Haas). The formulated mixture was equilibrated for 24 hours and then coatings were applied on glass plates to give 3–4 mil thick coatings. Films were placed outdoors in complete sunlight for 12 days. Film swell ratios in methyl ethyl ketone were obtained.

| Film | Polymer | AAEM Level (wt. %) | Film Swell Ratio |
|---|---|---|---|
| 4 | III | 0 | dissolves |
| 5 | IV | 5 | 3.5 |
| 6 | V | 10 | 2.2 |

Film 5 and 6 according to the invention show better cure than comparative example 4. Cure improves with higher levels of enamine (film 6 better than film 5).

EXAMPLE 3

Cure Rate Comparison with Just Neutralized Samples

A polymer (VI) was prepared from a monomer mixture that contained 501.7 g. water, 45.74 g. sodium dodecyl benzene sulfonate (23% solution), 74.7 g. acetoacetoxyethyl methacrylate, 709.7 g. butyl acrylate, 690.2 g. methyl methacrylate, 19.4 g. methacrylic acid and 2.99 g. n-dodecylmercaptan. From this monomer emulsion mixture, 47.2 g. was removed and added to a kettle containing a mixture of 1317.9 g. water and 22.04 g. sodium dodecyl benzene sulfonate heated to 85° C. under nitrogen. An initiator charge of 2.26 g. sodium persulfate dissolved in 50 g. water was added. Ten minutes later, the remaining monomer emulsion was gradually added over a three hour period along with 1.13 g. sodium persulfate dissolved in 50 g. water. After the three hour period, the emulsion was cooled to 60° C. and 0.7 g. t-butyl hydroperoxide dissolved in 12.5 g. water was added followed by 1.03 g. isoascorbic acid dissolved in 12.5 g. water. The latex was cooled to ambient temperature.

Using a similar procedure, polymer (VII) was prepared from a monomer mixture that contained 501.7 g. water, 45.74 g. sodium dodecyl benzene sulfonate (23% solution), 149.4 g. acetoacetoxyethyl methacrylate, 672.3 g. butyl acrylate, 652.9 g. methyl methacrylate, 19.4 g. methacrylic acid and 2.99 g. n-dodecylmercaptan.

A 100 g. portion of each polymer was neutralized to pH=9.5 with sodium hydroxide. Other 100 g. portions were neutralized to pH=8.5 or 9.0 or 9.5 with ammonia. A final 100 g. portion was neutralized to pH=9.5 and continually readjusted over a 24 hour period to maintain a pH=9.5. To these portions was added a premix consisting of 4 g. propylene glycol and 1 g. 10% aqueous solution of urethane rheology (QR-708; Rohm and Haas). After a 24 hour equilibration period, the pH of the solutions was obtained and films were applied on glass slides and air dried for two hours to give 1–2 mil thick coatings. The films were exposed for varying periods of time to ultraviolet radiation provided by 8 UVA-340 bulbs (Q-Panel Co) arrayed 16 inches above the films in a light box. Total radiation levels in the box are 4.7 Joules/cm2/hour. Film swell ratios of the exposed films were measured in methyl ethyl ketone.

| Film | Base | pH neut. | pH equil. | 2 h | 4 h | 6 h | 8 h | 16 h | 24 h |
|---|---|---|---|---|---|---|---|---|---|
| Polymer VI (5% AAEM) | | | | | | | | | |
| 7 | NaOH | 8.5 | 8.3 | d | x | x | 17 | 10 | |
| 8 | NH3 | 8.5 | 7.7 | d | x | 24 | 18 | 11 | 6.4 |
| 9 | NH3 | 9.0 | 7.9 | d | 39 | 23 | 16 | 9.5 | 6.2 |
| 10 | NH3 | 9.5 | 8.3 | x | 24 | 20 | 15 | 9.0 | 5.3 |
| 11 | NH3 enamine | 9.5 | 9.5 | x | 22 | 20 | 14 | 8.5 | 4.9 |
| Polymer VII (10% AAEM) | | | | | | | | | |
| 12 | NaOH | 8.5 | 8.3 | d | d | x | 18 | 11 | 7.3 |
| 13 | NH3 | 8.5 | 7.3 | x | 33 | 21 | 16 | 7.2 | 5.4 |
| 14 | NH3 | 9.0 | 7.7 | x | 26 | 19 | 14 | 6.6 | 5.2 |
| 15 | NH3 | 9.5 | 8.1 | x | 16 | 14 | 11 | 6.4 | 4.4 |
| 16 | NH3 enamine | 9.5 | 9.5 | x | 15 | 13 | 11 | 6.1 | 4.5 |

Notes:
neut. = neutralized pH;
equil. = equilibrated pH;
d = dissolves;
x = lightly crosslinked Films 11 and 16 according to the invention display a faster cure rate than the acetoacetate functional polymers (Films 7 and 12) and polymers neutralized to various pH values (Films 8, 9, 10, 13, 14, 15).

EXAMPLE 4

Effect of Various Enamines on Rates of UV Cure

Polymer VI from Example 3 was divided into 100 g portions and was neutralized with the amines listed in the Table below. An additional one equivalent of amine based on acetoacetate was added and a premix and consisting of 4 g. propylene glycol and 1 g. 10% aqueous solution of urethane rheology modifier (QR-708; Rohm and Haas) was added. After a 24 hour equilibration period, films were applied on glass slides and air dried to give 1–2 mil thick coatings. One set of film was heated at 60° C. for 168 hours in a dark oven, another set of films were exposed for varying periods of time to ultraviolet radiation provided by 8 UVA-340 bulbs (Q-Panel Co) arrayed 16 inches above the films in a light box. Film swell ratios of the unexposed and exposed films were measured in methyl ethyl ketone.

|      |              | Film Swell Ratios (MEK) |     |     |     |      |     |
|------|--------------|-------------------------|-----|-----|-----|------|-----|
|      |              | exposed                 |     |     |     |      |     |
|      |              | Additional              | 60° C. - 168 h | | | | |
| Film | Base         | Added                   | 2 h | 4 h | 8 h | 24 h | 0 h |
| 17   | NaOH         | —                       | dis | dis | gel | 12   | dis |
| 18   | ammonia      | 0.47 g                  | gel | 14  | 12  | 4.9  | dis |
| 19   | ethanolamine | 0.57 g                  | gel | 13  | 11  | 4.7  | dis |
| 20   | diglycolamine| 0.98 g                  | gel | 13  | 10  | 4.1  | dis |
| 21   | isopropylamine| 0.57 g                 | gel | 15  | 12  | 5.9  | dis |

Notes:
gel = very lightly crosslinked;
dis = dissolved

Enamines made from primary amines (films 19, 20 and 21) cure at a faster rate than enamines using ammonia (film 18). The acetoacetate functional polymer in comparative example 17 cures the slowest.

EXAMPLE 5

Effect of Enamine, Volatility of Amine

A 100 g. portion of polymer VI (Example 3) was neutralized to pH=9.5 with sodium hydroxide. Another 100 g. portion was neutralized to pH=9.5 with ammonia and an additional 0.47 grams of ammonia was added for complete enamine formation of the acetoacetate. A final 100 g. portion was neutralized to pH=9.5 with ethanolamine and an additional 0.57 g. ethanolamine was added for complete enamine formation of the acetoacetate. To these portions was added a premix consisting of 4 g. propylene glycol and 1 g. 10% aqueous solution of urethane rheology modifier (QR-708; Rohm and Haas). After a 24 hour equilibration period, films were applied on glass slides and air dried to give 1–2 mil thick coatings. One set of film was heated at 60° C. for 168 hours in a dark oven, another set of films were exposed for varying periods of time to ultraviolet radiation provided by 8 UVA-340 bulbs (Q-Panel Co) arrayed 16 inches above the films in a light box. A final set of films were heated for 24 hours in a 60° C. oven and then exposed to the ultraviolet radiation. Total radiation levels in the box are 4.7 Joules/cm2/hour. Film swell ratios of the unexposed and exposed films were measured in methyl ethyl ketone.

|      |              | Film Swell Ratios (MEK) | | Oven Aged |
|------|--------------|------|------|-----------|
| Film | Base         | 8 h  | 24 h | 168 h     |
| A) Air dried films ||||
| 22   | NaOH         | gel  | 8.0  | dissolves |
| 23   | ammonia      | 13   | 4.4  | dissolves |
| 24   | ethanolamine | 6.9  | 4.9  | dissolves |
| B) Heat-Aged Samples (24 h @ 60° C.) before exposure ||||
| 25   | NaOH         | 19   | 10   |           |
| 26   | ammonia      | 10   | 8.7  |           |
| 27   | ethanolamine | 7.1  | 4.9  |           |

Note:
gel = lightly crosslinked

The cure rate of heat aged film 26 with the enamine from ammonia is slower than the air dried film 23 demonstrating the reversibility of enamine formation and subsequent volatility of ammonia from the film. A similar series of films containing enamine functional polymers made using ethanolamine does not exhibit this behavior (film 27 and 24). Comparative examples 22 and 25 are poorly cured.

EXAMPLE 6

Effect of Photoinitiator in UVA-340 Light Box

In a similar procedure to polymer VI in Example 3, polymer (VIII) was prepared from a monomer mixture that contained 501.7 g. water, 45.74 g. sodium dodecyl benzene sulfonate (23% solution), 747 g. butyl acrylate, 727.6 g. methyl methacrylate, 19.4 g, methacrylic acid and 2.99 g. n-dodecylmercaptan.

Formulations similar to films 22, 23 and 24 from Example 5 were made with the addition of 1 wt. % (0.4 g) of a photoinitiator listed in the Table below. Comparative example were made from similar formulations using polymer VI. Films were cured in a similar fashion to Example 5.

|      | AAEM |              |                | Film Swell Ratios (MEK) | | | |
|------|------|--------------|----------------|-----|-----|-----|------|
| Film | %    | Base         | Photoinitiator | 2 h | 4 h | 8 h | 24 h |
| 28   | 5    | NaOH         | none           | dis | dis | gel | 12   |
| 29   | 5    | ammonia      | none           | gel | 14  | 12  | 4.9  |
| 30   | 5    | ethanolamine | none           | gel | 13  | 11  | 4.7  |
| 31   | 5    | NaOH         | DEAP           | gel | 25  | 8.6 | 9.5  |
| 32   | 5    | ammonia      | DEAP           | 12  | 9   | 6.6 | 4.5  |
| 33   | 5    | ethanolamine | DEAP           | 12  | 7   | 6.3 | 5.4  |
| 34   | 5    | NaOH         | benzophenone   | 9.5 | 7   | 7.1 | 5.4  |
| 35   | 5    | ammonia      | benzophenone   | 7.4 | 6.4 | 4.7 | 5.4  |
| 36   | 5    | ethanolamine | benzophenone   | 6.8 | 5.2 | 4.4 | 5.1  |
| 37   | 0    | ammonia      | none           | dis | dis | dis | dis  |
| 38   | 0    | ammonia      | benzophenone   | 14  | 10  | 8.9 | 8.6  |
| 39   | 0    | ammonia      | DEAP           | dis | dis | dis | dis  |

Notes:
dis = dissolves, no cure;
gel = lightly crosslinked

The addition of photoinitiators in films 31–36 demonstrate faster cure than films without photoinitiator (films 28–30). Comparative examples 37–39 in a non-functional polymer show poorer cure rates. The dependence of cure rate on type of enamine still hold true.

EXAMPLE 7

Effect of Photoinitiator in UV Processor and Light Box

A polymer (IX) was prepared from a monomer mixture that contained 905 g. water, 36.5 g. sodium dodecyl benzene sulfonate (23% solution), 206.8 g. acetoacetoxyethyl methacrylate, 1034 g. butyl acrylate, 796.2 g. methyl methacrylate, 31 g. methacrylic acid and 2.07 g. n-dodecylmercaptan. From this monomer emulsion mixture, 30 g. was removed and added to a kettle containing a mixture of 1278 g. water and 0.46 g. sodium dodecyl benzene sulfonate heated to 85° C. under nitrogen. An initiator charge of 3.6 g. sodium persulfate dissolved in 50 g. water was added. Ten minutes later, 7.2 g. sodium carbonate dissolved in 43.2 g. water was added over a five minute period. Then, the remaining monomer emulsion was gradually added over a two hour period along with 3.6 g. sodium persulfate dissolved in 50 g. water. After the two hour period, the emulsion was cooled to 60° C. and 0.5 g. t-butyl hydroperoxide dissolved in 10 g. water was added followed by 0.25 g. isoascorbic acid dissolved in 10 g. water. The addition of t-butyl hydroperoxide and isoascorbic acid was repeated fifteen minutes later. The latex was cooled to ambient temperature.

Aliqouts (50 g.) were neutralized to pH=9.5 with ethanolamine. An additional 0.64 g. ethanolamine was added to each aliquot to allow for complete enamine formation of the acetoacetate. To these aliqouts was added a premix consisting of 2.25 g. propylene glycol, 2.25 g. diisopropyladipate, 0.4 g. nonionic surfactant (Triton X-405; Union Carbide), 2 g. water, 0.56 g.10% aqueous solution of a urethane rheology modifier (QR-708; Rohm and Haas) and the photoinitiator listed in the Table below (0.225 g. at 1 wt. % level, 0.45 g. at the 2 wt. % level). After a 24 hour equilibration period, films were applied on glass slides and air dried to give 1–2 mil thick coatings.

One set of coatings were cured using a Aetek Model QC1202 Ultraviolet Processor equipped with two medium pressure mercury vapor arc lamps set on high (200 watts/inch) using a line speed of 20 feet per minute. At these settings, the films received approximately 1.8–2 Joules/cm2 of radiation on each pass through the machine. The other set was cured under 8 UVA-340 bulbs in the light box for the specified time at a radiation rate of 4.7 Joules/cm2/hour. Film swell ratios were determined in methyl ethyl ketone.

A) Film cured by UV Processor

| Film | Photosensitizer | Amount | Thin Film Swell Ratios | |
|---|---|---|---|---|
| | | | 1 pass | 4 pass |
| 40 | none | — | dissolves | gel |
| 41 | DEAP | 1% | gel | gel |
| 42 | Darocur 1173 | 1% | gel | gel |
| 43 | benzophenone | 1% | 6.5 | 10.4 |
| 44 | ITX | 1% | 7.1 | 8.5 |
| 45 | DEAP | 2% | gel | gel |
| 46 | Darocur 1173 | 2% | gel | gel |
| 47 | benzophenone | 2% | 7.1 | 9.8 |
| 48 | ITX | 2% | 5.1 | 4.9 |

B) Films Cured by UVA-340 Bulbs

| Film | Photosensitizer | Amount | Thin Film Swell Ratios | |
|---|---|---|---|---|
| | | | 1 pass | 4 pass |
| 49 | none | — | dissolves | gel |
| 50 | DEAP | 1% | gel | 8 |
| 51 | Darocur 1173 | 1% | gel | 7.4 |
| 52 | benzophenone | 1% | 7.5 | 5.3 |
| 53 | ITX | 1% | 5.1 | 4.9 |
| 54 | DEAP | 2% | gel | 7.1 |
| 55 | Darocur 1173 | 2% | gel | 5.4 |
| 56 | benzophenone | 2% | 7 | 6.1 |
| 57 | ITX | 2% | 5 | 4.8 |

Notes:
gel = very lightly crosslinked;
Darocur 1173 (EM Chemicals)

Films 41–48 and 50–57 containing photoinitiator show improved cure compared to films 40 and 49 that do not contain photoinitiator. Higher photoinitiator levels (films 44–48 and 54–57) show improved cure over lower levels (films 41–44 and 50–53).

EXAMPLE 8

Effect of AAEM Level, Enamines using UV Processor

A polymer (X) was prepared from a monomer mixture that contained 430 g. water, 13.4 g. sodium lauryl sulfate sulfonate (28% solution), 5.7 g. anionic surfactant (Aerosol A-103; American Cyanamid), 7.5 g. itaconic acid and 742.5 g. methyl acrylate. From this monomer emulsion mixture, 591 g. was removed and added to a kettle containing a mixture of 729.4 g. water, 13.4 g. sodium lauryl sulfate sulfonate (28% solution). An initiator charge of 10.0 g. a 0.15% aqueous solution of $FeSO_4.7H_2O$ and 0.225 g. ammonium persulfate dissolved in 5 g. water was added. A few minutes later, 0.225 g. sodium formaldehyde sulfoxylate dissolved in 5 g. water and 0.15 g. sodium sulfoxylate was added. After 1.5 hours, the remaining monomer emulsion was added followed by 0.225 g. ammonium persulfate dissolved in 5 g. water was added. A few minutes later, 0.225 g. sodium formaldehyde sulfoxylate dissolved in 5 g. water and 0.05 g. sodium sulfoxylate. After 1.5 hours, 0.5 g. t-butyl hydroperoxide dissolved in 2.5 g. water was added followed by 0.25 g. sodium formaldehyde sulfoxylate dissolved in 5 g. water. The latex was cooled to ambient temperature.

Using a similar procedure, polymer XI was prepared from a monomer mixture that contained 430 g. water, 13.4 g. sodium lauryl sulfate (28% solution), 5.7 g. anionic surfactant (Aerosol A-103; American Cyanamid), 112.5 g. acetoacetoxyethyl methacrylate, 7.5 g. itaconic acid and 630 g. methyl acrylate. Additionally, sodium persulfate was used in place of ammonium persulfate.

Using a similar procedure, polymer XII was prepared from a monomer mixture that contained 430 g. water, 13.4 g. sodium lauryl sulfate sulfonate (28% solution), 5.7 g. anionic surfactant (Aerosol A-10; American Cyanamid), 225 g. acetoacetoxyethyl methacrylate, 7.5 g. itaconic acid and 517.5 g. methyl acrylate. Additionally, sodium persulfate was used in place of ammonium persulfate.

A polymer (XIII) was prepared from a monomer mixture that contained 509.2 g. water, 23.1 g. anionic surfactant (Alipal CO-436), 1544 g. acetoacetoxyethyl methacrylate, 23.5 g. methacrylic acid and 3.1 g. n-dodecylmercaptan.

From this monomer emulsion mixture, 49.1 g. was removed and added to a kettle containing a mixture of 1274.7 g. water and 3.89 g. anionic surfactant (Alipal CO-436) heated to 60° C. under nitrogen. An initiator charge of 15 mg. FeSO4.7H20 dissolved in 10 g. water followed by 5.8 g. t-butyl hydroperoxide dissolved in 10 g. water and 4.0 g. isoascorbic acid dissolved in 10 g. water was added. Fifteen minutes later, the remaining monomer emulsion was gradually added over a 2.5 hour period along with 5.8 g. t-butyl; hydroperoxide dissolved in 50 g. water and 4.0 g. isoascorbic acid dissolved in 50 g. water. After the 2.5 hour period. 0.2 g. t-butyl hydroperoxide dissolved in 10 g. water was added followed by 0.7 g. isoascorbic acid dissolved in 10 g. water. The latex was cooled to ambient temperature.

Aliquots (10 g.) of each latex was neutralized to pH=9.5 with the base in the Table below. Additional abase was added in the amounts shown to allow for complete enamine formation of the acetoacetate. A premix consisting of 0.4 g. propylene glycol, 0.1 g. 10% aqueous solution of urethane rheology modifier (QR-708; Rohm and Haas) was added to each aliquot. An additional 10 g. water was added to the films containing polymer XIII (98.5 AAEM). After 24 hours equilibration, film were made on glass slides and air dried to give 1–2 mil thick films. These films were cured with one pass through the Aetek Model QC-1202 Ultraviolet Processor equipped with two medium pressure mercury vapor arc lamps set on high (200 watts/inch) using a line speed of 20 feet per minute. At these settings, the films received approximately 1.8–2 Joules/cm2 of radiation.

| Film | AAEM (%) | Base | Additional Base | Soluble Fraction | Swell Ratio |
|---|---|---|---|---|---|
| Polymer X | | | | | |
| 58 | 0 | NaOH | none | 0.01 | 15.2 |
| 59 | 0 | ammonia | none | 0.47 | 14.7 |
| 60 | 0 | ethanolamine | none | 0.51 | 19.4 |
| Polymer XI | | | | | |
| 61 | 15 | NaOH | none | 0.05 | 11.6 |
| 62 | 15 | ammonia | 0.21 g | 0.07 | 12.3 |
| 63 | 15 | ethanolamine | 0.21 g | 0.05 | 9.6 |
| Polymer XII | | | | | |
| 64 | 30 | NaOH | none | 0.06 | 9.2 |
| 65 | 30 | ammonia | 0.38 g | 0.06 | 8.5 |
| 66 | 30 | ethanolamine | 0.38 g | 0.04 | 6.3 |
| Polymer XIII | | | | | |
| 67 | 98.5 | NaOH | none | 0.32 | 6.6 |
| 68 | 98.5 | ammonia | 1.2 g | 0.43 | 8.0 |
| 69 | 98.5 | ethanolamine | 1.2 g | 0.07 | 1.5 |

Higher levels of AAEM cure at faster rates. The enamines made by ethanolamine and ammonia cure faster than comparative examples 58, 61, 64 and 67.

EXAMPLE 9

Preparation of Polymers XIV and XV

Polymer XIV was prepared from a monomer mixture that contained 525 g. of water, 7.3 g. of sodium dodecyl benzene sulfonate (23% solution), 721 g. of butyl acrylate, 826 g. of methyl methacrylate, and 20.4 g. of methacrylic acid. From this monomer mixture, 49.1 g. was removed and added to a kettle (and rinsed with 10 g. of water) containing a mixture of 1200 g. of water and 9.8 g. of sodium dodecyl benzene sulfonate (23% solution) heated to 90 C. under nitrogen. 2.4 g. sodium persulfate dissolved in 80 g. of water was then added to the kettle. Twenty minutes later, the remaining monomer emulsion was gradually added to the kettle over a two hour period at 85 C. A cofeed of 1.4 g. sodium persulfate dissolved in 50 g. of water was added to the kettle gradually over this same period. When the monomer emulsion feed was complete, 29 g. water was added, and the batch was held at 85 C. for 30 minutes, then cooled to 60 C. At 60 C., 1 g. t-butyl hydroperoxide (70% solution) dissolved in 13 g. of water was added to the kettle, followed by 0.5 g. isoascorbic acid dissolved in 13 g. of water. The batch was held for 15 minutes then cooled to ambient temperature.

Polymer XV was prepared according to the method of Polymer XIV with a monomer mixture that contained 525 g. of water, 7.3 g. of sodium dodecyl benzene sulfonate (23% solution), 624.6 g. of butyl acrylate, 747.6 g. of methyl methacrylate, 156.7 g. of acetoacetoxyethyl methacrylate, and 20.4 g. of methacrylic acid.

EXAMPLE 10

Preparation of Polymers XVI and XVII

Polymer XVI was prepared from a monomer mixture that contained 525 g. of water, 11.2 g. of sodium lauryl sulfate (28% solution), 579.9 g. of butyl acrylate, 956.2 g. of methyl methacrylate, and 31.3 g. of methacrylic acid. A mixture of 4.7 g. of ammonium bicarbonate dissolved in 20 g. of water was charged to a kettle containing a mixture of 1200 g. of water and 11.2 g. of sodium lauryl sulfate (28% solution) heated to 85 C. under nitrogen. Then 84.1 g. of the monomer mixture was added to the kettle (and rinsed with 10 g. of water). Then 2.4 g. ammonium persulfate dissolved in 80 g. of water was added to the kettle. Ten minutes later, the remaining monomer emulsion was gradually added to the kettle over a two hour period at 85 C. Also, 1.4 g. ammonium persulfate dissolved in 50 g. of water was added to the kettle gradually over this same period. When the monomer emulsion feed was complete, the tank was rinsed to the kettle with 39 g. of water. When the feeds were complete, the batch was held at 85 C. for 30 minutes, then cooled to 60 C. At 60 C., 1 g. t-butyl hydroperoxide (70% solution) dissolved in 13 g. of water was added to the kettle, followed by 0.5 g. isoascorbic acid dissolved in 13 g. of water. The batch was held for 15 minutes then cooled to ambient temperature.

Polymer XVII was prepared according to the method of Polymer XVI from a monomer mixture that contained 525 g. of water, 11.2 g. of sodium lauryl sulfate (28% solution), 485.9 g. of butyl acrylate, 893.5 g. of methyl methacrylate, 156.7 g. of acetoacetoxyethyl methacrylate, and 31.3 g. of methacrylic acid.

EXAMPLE 11

Preparation of Exterior Coatings for Durability Testing (All quantities are in g.)

Before formulating into paints, the polymers were neutralized to pH 9.5–10 with concentrated ammonia. After equilibration for 3 days, the pH was again measured and the paint pH was at least 9.5.

| Paint | 1 | 2 | 3 | 4 | 5 | 6 |
|---|---|---|---|---|---|---|
| Polymer | XIV | XV | XV | XVI | XVII | XVIII |
| Ingredients | | | | | | |
| Polymer | 200 | 180 | 180 | 180 | 180 | 180 |

17 -continued

| | | | | | | |
|---|---|---|---|---|---|---|
| Black Colorant (Huls 896-9901) | 13.2 | 11.9 | 11.9 | 11.9 | 11.9 | 11.9 |
| Methyl CARBITOL | 13 | 11.7 | 11.7 | 11.7 | 11.7 | 11.7 |
| TEXANOL | 13 | 11.7 | 11.7 | 11.7 | 11.7 | 11.7 |
| Linoleic Acid | — | — | 2.3 | — | — | 2.3 |
| Ultra AQUACAT (5% Co(II)) | — | — | 1.5 | — | — | 1.5 |
| Ultra MAGNACAT (5% Mn(II)) | — | — | 0.7 | — | — | 0.7 |
| Ammonia (conc.) | 1 | 1 | 1 | 1 | 1 | 1 |
| Sodium Nitrite (15%) | 1.1 | 1.0 | 1.0 | 1.0 | 1.0 | 1.0 |
| Rheology Modifier (QR 708; 10%) | 0.8 | 0.8 | 2.3 | 0.8 | 0.9 | 2.9 |

Each paint was drawn down on BONDERITE 1000 Iron Phosphate-treated steel to a dry film thickness of 2 mils and air-dried for one week.

EXAMPLE 12

Durability of Coatings

The air-dried films prepared in Example 11 were placed in a QUV-B tester and subjected to irradiation, believed to simulate outdoor exposure on an accelerated basis. The minimum loss of coating gloss on exposure is a measure of the increased durability or better weatherability of the coatings film.

Gloss Retention After QUV-B Exposure of Black AAEM Paints

| | | 20° | Gloss | | Gloss | |
|---|---|---|---|---|---|---|
| Polymer | AAEM | Initial | 1 wk | % Ret'd | 2 wk | % Ret'd |
| XIV | 0 | 46 | 2 | 4 | 4 | 9 |
| XV | 10 | 60 | 42 | 70 | 33 | 55 |
| XV | 10/LA | 60 | 41 | 68 | 32 | 53 |
| XVI | 0 | 66 | 3 | 5 | 1 | 2 |
| XVII | 10 | 65 | 51 | 78 | 45 | 69 |

18 -continued

Gloss Retention After QUV-B Exposure of Black AAEM Paints

| | | 20° | Gloss | | Gloss | |
|---|---|---|---|---|---|---|
| Polymer | AAEM | Initial | 1 wk | % Ret'd | 2 wk | % Ret'd |
| XVII | 10/LA | 66 | 48 | 73 | 42 | 64 |

We claim:
1. A process of preparing a cured coating on a surface comprising
   a) mixing a vinyl polymer having acetoacetyl functional groups with an amount of ammonia or primary amine sufficient to convert the acetoacetyl groups to enamine,
   b) storing the mixture for a period sufficient to allow the reactants to equilibrate,
   c) adding a sufficient amount of ammonia or primary amine to raise the pH to about 9,
   d) maintaining the pH at about 9 until the coating is applied to the substrate,
   e) applying the coating to a substrate, and
   f) exposing the coated substrate to ultraviolet light for a time sufficient to produce the desired degree of cure.
2. A process for preparing a coating with improved exterior durability comprising
   a) mixing a vinyl polymer having acetoacetyl functional groups with an amount of ammonia or primary amine sufficient to convert the acetoacetyl groups to enamine,
   b) storing the mixture for a period sufficient to allow the reactants to equilibrate,
   c) adding a sufficient amount of ammonia or primary amine to raise the pH to about 9, and
   d) maintaining the pH at about 9 until the coating is applied to the substrate,
   e) applying the coating to a substrate,
   f) exposing the coating to visible radiation.

* * * * *